US008720970B1

(12) United States Patent
Fletcher

(10) Patent No.: US 8,720,970 B1
(45) Date of Patent: May 13, 2014

(54) FOLDING COVER

(71) Applicant: Mark Fletcher, York, NE (US)

(72) Inventor: Mark Fletcher, York, NE (US)

( * ) Notice: Subject to any disclaimer, the term of this patent is extended or adjusted under 35 U.S.C. 154(b) by 0 days.

(21) Appl. No.: 13/727,704

(22) Filed: Dec. 27, 2012

(51) Int. Cl.
*B60P 7/02* (2006.01)

(52) U.S. Cl.
USPC ............ 296/100.09; 296/100.01; 296/100.02; 296/100.06

(58) Field of Classification Search
USPC ............ 296/100.01, 100.02, 100.06, 100.07, 296/100.08, 100.09; 105/377.04, 377.05
See application file for complete search history.

(56) References Cited

U.S. PATENT DOCUMENTS

| 3,995,890 | A | | 12/1976 | Fletcher |
| 4,418,954 | A | * | 12/1983 | Buckley .................. 296/100.09 |
| 5,947,178 | A | * | 9/1999 | Patten .......................... 160/193 |
| 6,827,389 | B1 | * | 12/2004 | Pandorf .................. 296/100.02 |
| 6,938,281 | B1 | * | 9/2005 | Tudor ............................... 4/498 |
| 7,131,684 | B1 | | 11/2006 | Gooding |
| 7,642,665 | B2 | * | 1/2010 | Konop et al. ................. 290/1 A |
| 2005/0086731 | A1 | * | 4/2005 | Scott ................................ 4/498 |
| 2006/0208526 | A1 | * | 9/2006 | Talbot et al. ............. 296/100.07 |
| 2007/0035151 | A1 | * | 2/2007 | Rusu ........................ 296/100.01 |
| 2007/0052257 | A1 | * | 3/2007 | Allen ....................... 296/100.09 |
| 2007/0108792 | A1 | * | 5/2007 | Weldy ...................... 296/100.09 |
| 2009/0278377 | A1 | * | 11/2009 | Maimin et al. .......... 296/100.09 |
| 2010/0019529 | A1 | * | 1/2010 | Alston ..................... 296/100.09 |

* cited by examiner

*Primary Examiner* — Lori Lyjak
(74) *Attorney, Agent, or Firm* — Dennis L. Thomte; Thomte Patent Law Office LLC

(57) ABSTRACT

A folding cover for covering a trailer body, a truck body or other object. The folding cover includes a plurality of cover members which are foldably interconnected so as to be selectively movable between a covering position and a stowed position.

19 Claims, 11 Drawing Sheets

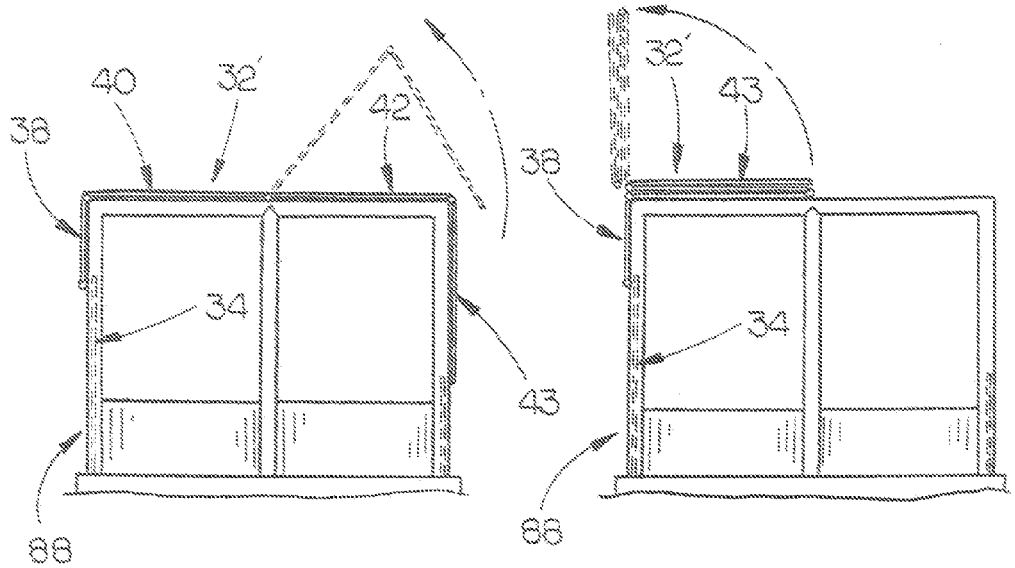
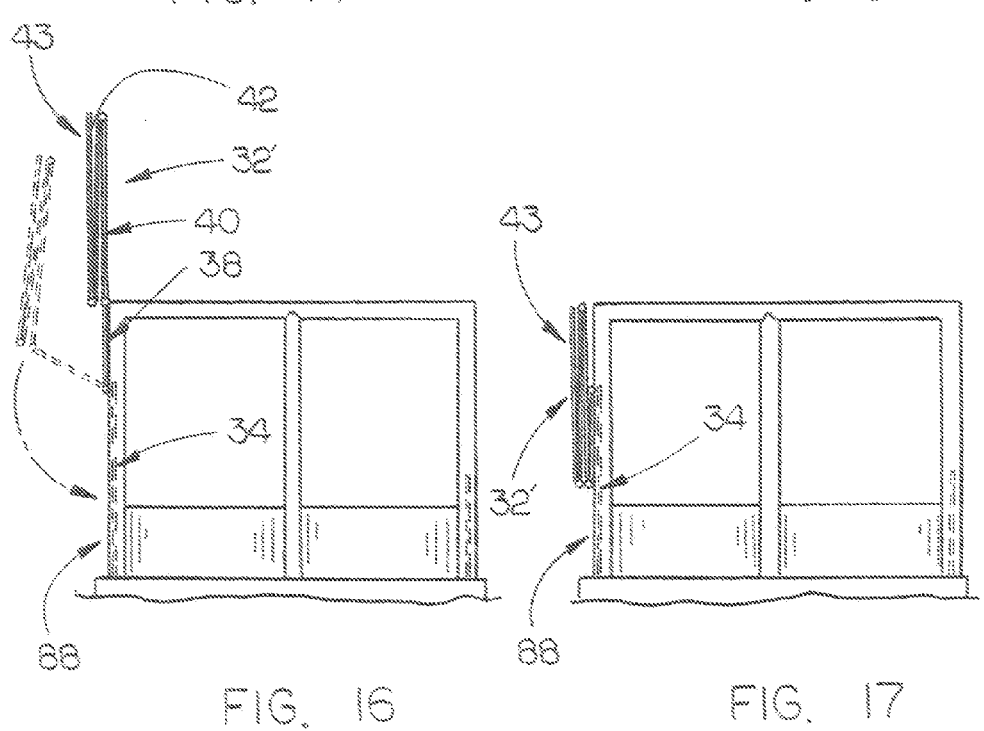
FIG. 14  FIG. 15  FIG. 16  FIG. 17

US 8,720,970 B1

FOLDING COVER

BACKGROUND OF THE INVENTION

1. Field of the Invention

This invention relates to a folding cover and more particularly to a folding cover for a truck body, a trailer body, or an object such as an irrigation pump, fan or the like.

2. Description of the Related Art

Many covers have been previously provided for covering a truck body, a trailer body or other structure requiring a cover thereover. Conventional truck or trailer body covers consist of a flexible tarp which is placed over the open upper end of the truck or trailer body. The flexible tarps do function quite well but it may be difficult to stow the tarp in a non-covering position. Further, the flexible tarps tend to flap in the wind as the truck or trailer is moved from one location to another which may cause undue wear on the tarp.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A folding cover is disclosed for a body such as a truck body or trailer body including a front wall having an upper end, a lower end, an inner side and an outer side. The body also includes a first side wall having an upper end, a lower end, an inner side and an outer side. The body also includes a second side wall having an upper end, a lower end, an inner side and an outer side. The body further includes a back wall having an upper end, a lower end, an inner side and an outer side.

The folding cover includes a first elongated support which is secured to the outer side of the first side wall of the body below the upper end thereof. The cover also includes a first rectangular cover member having a forward end, a rearward end, a first side edge, a second side edge, and an outer side and an inner side with the first side edge of the first cover member being foldably connected to the support member. The cover of this invention also includes a second rectangular cover member having a forward end, a rearward end, a first side edge, a second side edge, an outer side and an inner side with the first side edge of the second cover member being foldably connected to the second side edge of the first cover member. The cover also includes a third rectangular cover member having a forward end, a rearward end, a first side edge, a second side edge, an outer side and an inner side. The first side edge of the third cover member is foldably connected to the second side edge of the second cover member.

The first cover member has a width which is substantially equal to the distance between the foldable connection of the first side edge of the first cover member and the first support. The second and third cover members have a combined width which is substantially equal to the distance between the upper ends of the first and second side walls of the body.

The first, second and third cover members are selectively movable between a body covering position and a stowed position. The first cover member is positioned adjacent the outer side of the first side wall of the body when the first, second and third cover members are in the body covering position. The second and third cover members extend between the upper ends of the first and second side walls of the body when the first, second and third cover members are in the body covering position. The first, second and third cover members are in a folded position at the outer side of the first side wall of the body when the first, second and third cover members are in the stowed position.

The cover of this invention may also be used to cover objects such as an irrigation pump, fan, etc.

It is therefore a principal object to provide an improved folding cover for truck bodies, trailer bodies, irrigation pumps, fans or other objects.

A further object of the invention is to provide a folding cover of the type described which is easily moved between stowed and covering positions, and vice versa.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 14 is an end view of a modified form of the cover in a covering position with the broken lines illustrating the manner in which the cover is initially folded;

FIG. 15 is a view similar to FIG. 14 but which illustrates the modified cover being further folded;

FIG. 16 is a view similar to FIG. 15 but which illustrates the modified cover in a further folded position; and FIG. 17 is a view similar to FIG. 16 but which shows the modified cover in a completely folded position.

DESCRIPTION OF THE PREFERRED EMBODIMENT

Figure 1:
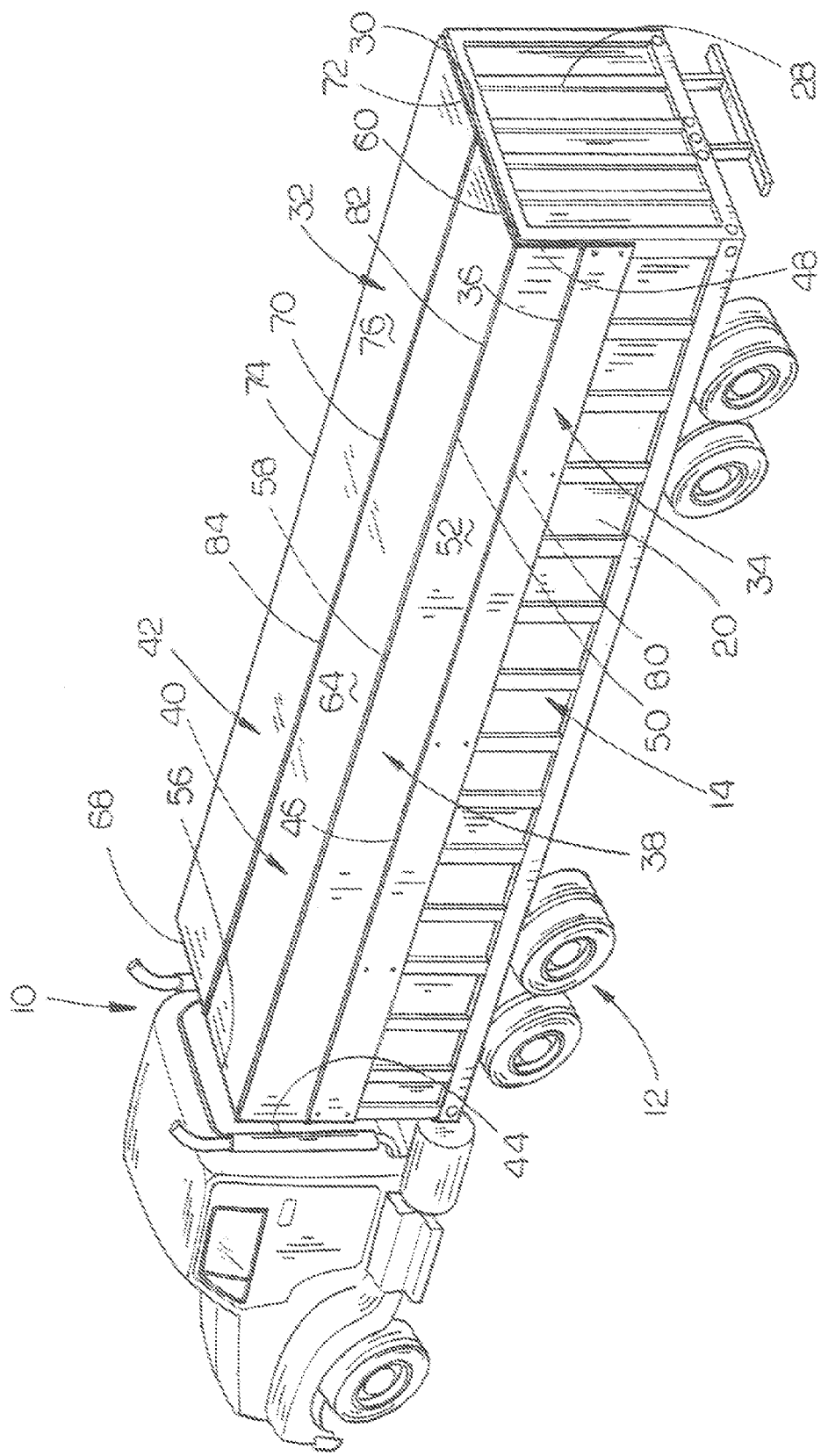
FIG. 1 is a perspective view of the folding cover of this invention mounted on the body of a semi-trailer.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional semi-trailer having a wheeled frame 12 which supports a body 14 having a front wall 16 with an upper end 18, a left side wall 20 with an upper end 22, a right side wall 24 with an upper end 26 and a back wall 28 with an upper end 30.

The numeral 32 refers to the cover of this invention. Cover 32 includes a flat, generally rectangular support member 34 which is affixed to the outer side of side wall 20 below the upper end 22 of side wall 20. Support member 34 has a horizontally disposed upper end 36, as seen in the drawings. Cover 32 also includes rectangular cover members 38, 40 and 42 which will now be described in detail. Cover member 38 includes end edge 44, side edge 46, end edge 48, side edge 50, outer side 52 and an inner side 54. Cover member 40 includes end edge 56, side edge 58, end edge 60, side edge 62, outer side 64 and an inner side 66. Cover member 42 includes end edge 68, side edge 70, end edge 72, side edge 74, outer side 76 and an inner side 78.

The side edge 46 of cover member 38 is hingedly or foldably secured to the upper end 36 of support member 34 by any convenient means such as a flexible flap or hinge member 80.

The side edge 50 of cover member 38 is hingedly or foldably secured to side edge 58 of cover member 40 by any convenient means such as a flexible flap or hinge member 82.

The side edge 62 of cover member 40 is hingedly or foldably secured to side edge 70 of cover member 42 by any convenient means such as a flexible flap or hinge member 84.

The width of cover member 38 is the same as the distance between the upper end 36 of support member 34 and the upper end 22 of side wall 20 of body 14.

Preferably, cover members 40 and 42 have the same widths. The combined widths of cover members 40 and 42 equal the distance between the upper ends of side walls 20 and 24 of body 14. Preferably, cover members 38, 40 and 42 are constructed of a semi-rigid or rigid material such as aluminum, plastic, reinforced fabric, etc.

FIG. 1 illustrates the cover 32 in a closed position with respect to body 14. In the closed position, support member 34 is positioned adjacent the outer surface of side wall 20. In the closed position, cover members 40 and 42 extend over the upper end of body 14. In the closed position, the end edges 56 and 68 of cover members 40 and 42, respectively, rest on the upper end of frame wall 16 of body 14. In the closed position, the side edge 74 of cover member 42 rests on the upper end of side wall 24 of body 14. In the closed position, the end edges 60 and 72 of cover members 40 and 42, respectively, rest upon the upper end of back wall 28 of body 14. The side edge 74 of cover member 42 is secured to side wall 24 of body 14 by any convenient means such as ropes, hooks, fasteners, etc. It may also be desirable to secure the end edges 56 and 58 of cover members 40 and 42 to front wall 16 and to secure the end edges 60 and 72 of cover member 40 and 42 respectively to back wall 28 of body 14.

Figures 9, 10:
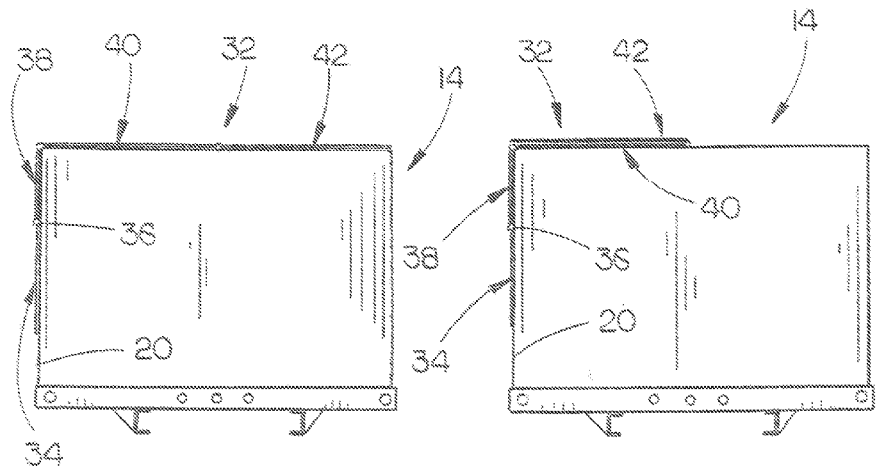
FIG. 9 is a rear view of the cover of this invention in its body covering position over the body of FIG. 1.
FIG. 10 is a rear view similar to FIG. 9 except that the third cover member has been folded onto the second cover member.

In the closed position of FIGS. 1 and 9, the cover member 38 of cover 32 is positioned adjacent the outer side of side wall 20 at the upper end thereof. In the closed position or body covering position, cover members 40 and 42 extend between the upper ends of side walls 20 and 24 of body 14.

Figure 5:
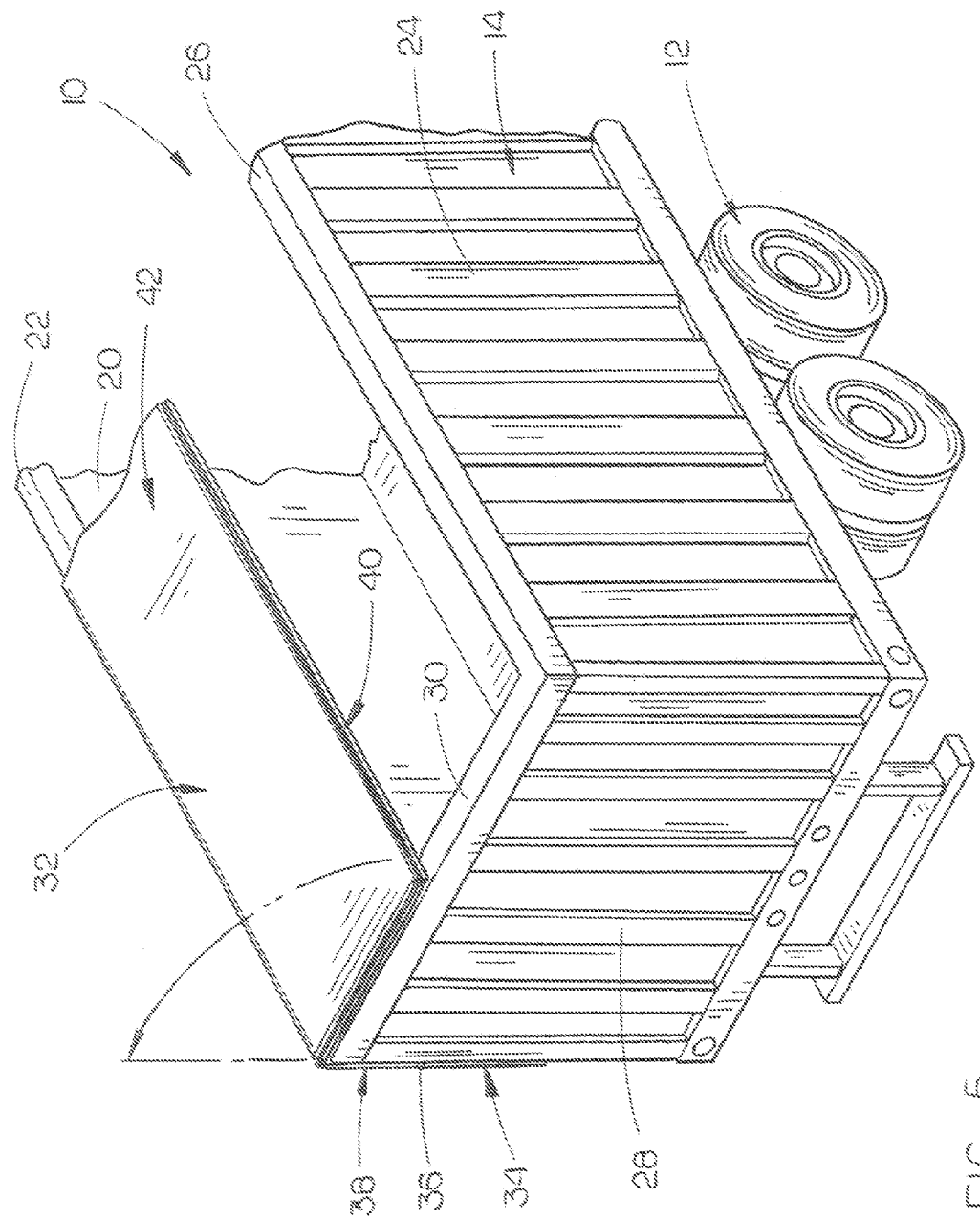
FIG. 5 is a view similar to FIG. 4 except that the third cover member has been folded onto the top of the second cover member.
Figure 6:
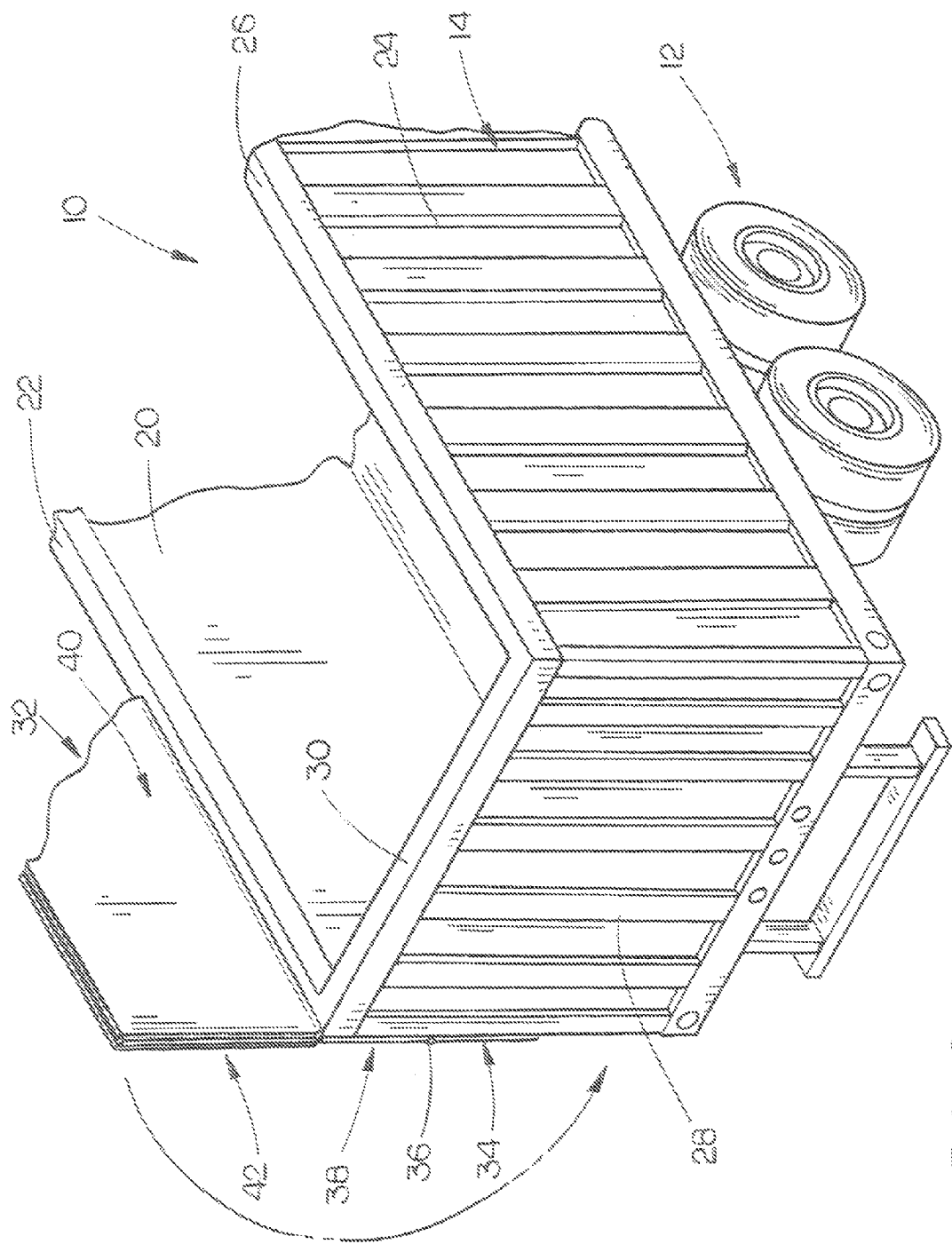
FIG. 6 is a view similar to FIGS. 4 and 5 except that the second and third cover members have been moved upwardly to a vertical position.

When it is desired to open the cover 32, the cover member 42 is folded over the cover member 40 so that the outer surfaces thereof are positioned adjacent one another (FIGS. 5 and 10). In this position, material could be placed within the body 14 at the right side of cover members 40 and 42. The next step in opening the cover 32 is to foldably move the cover members 40 and 42 from the position of FIGS. 5 and 10 to the position of FIGS. 6 and 11. The next step to position the cover 32 in its stowed position at the outer side of side wall 20 of body 14 is to fold cover member 38 from the position of FIGS. 6 and 11 to the position of FIGS. 7 and 12. Any convenient means may be utilized to maintain cover 32 in the stowed position of FIGS. 7 and 12.

Figure 2:
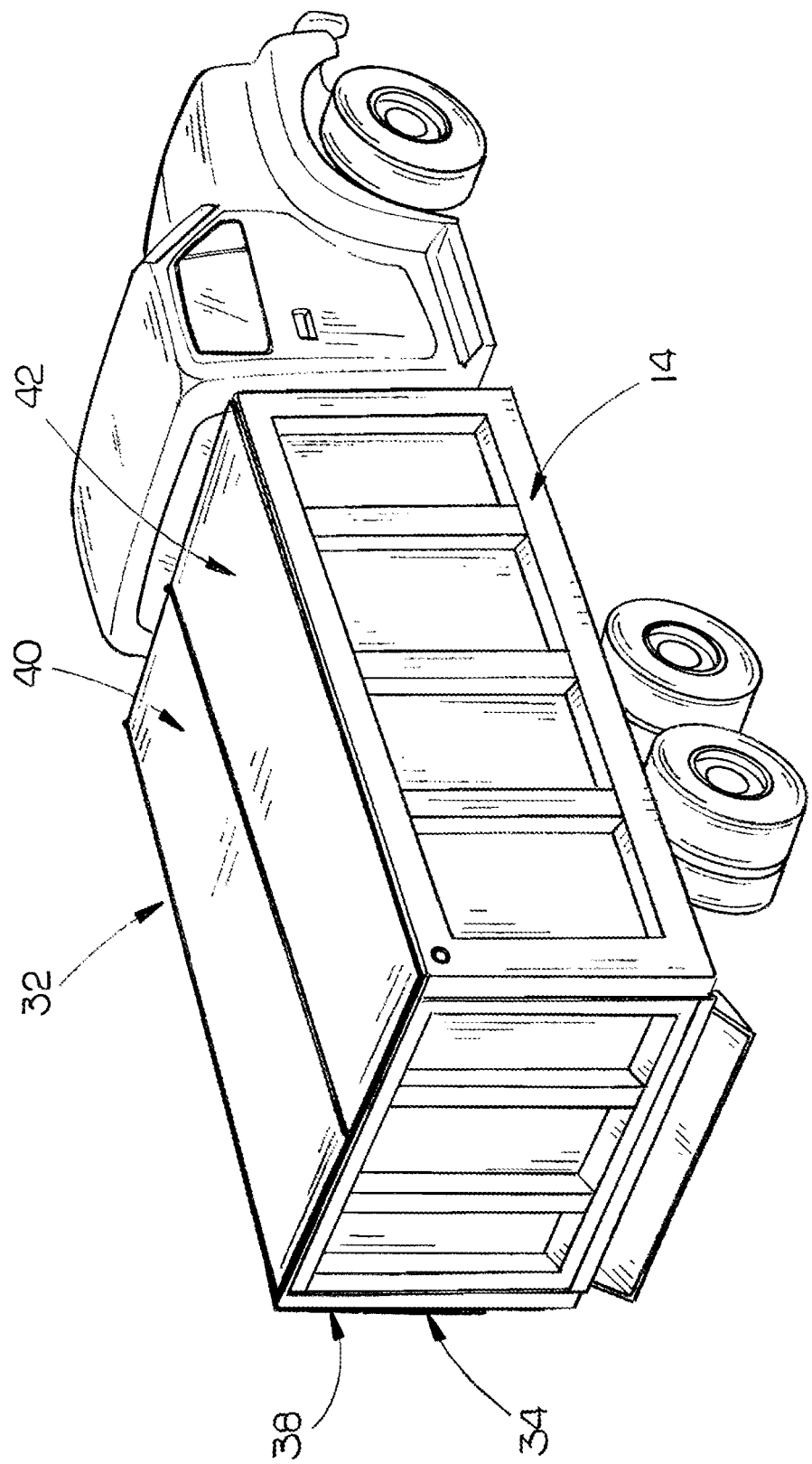
FIG. 2 is a perspective view of the folding cover of this invention mounted on the body of a truck.
Figure 3:
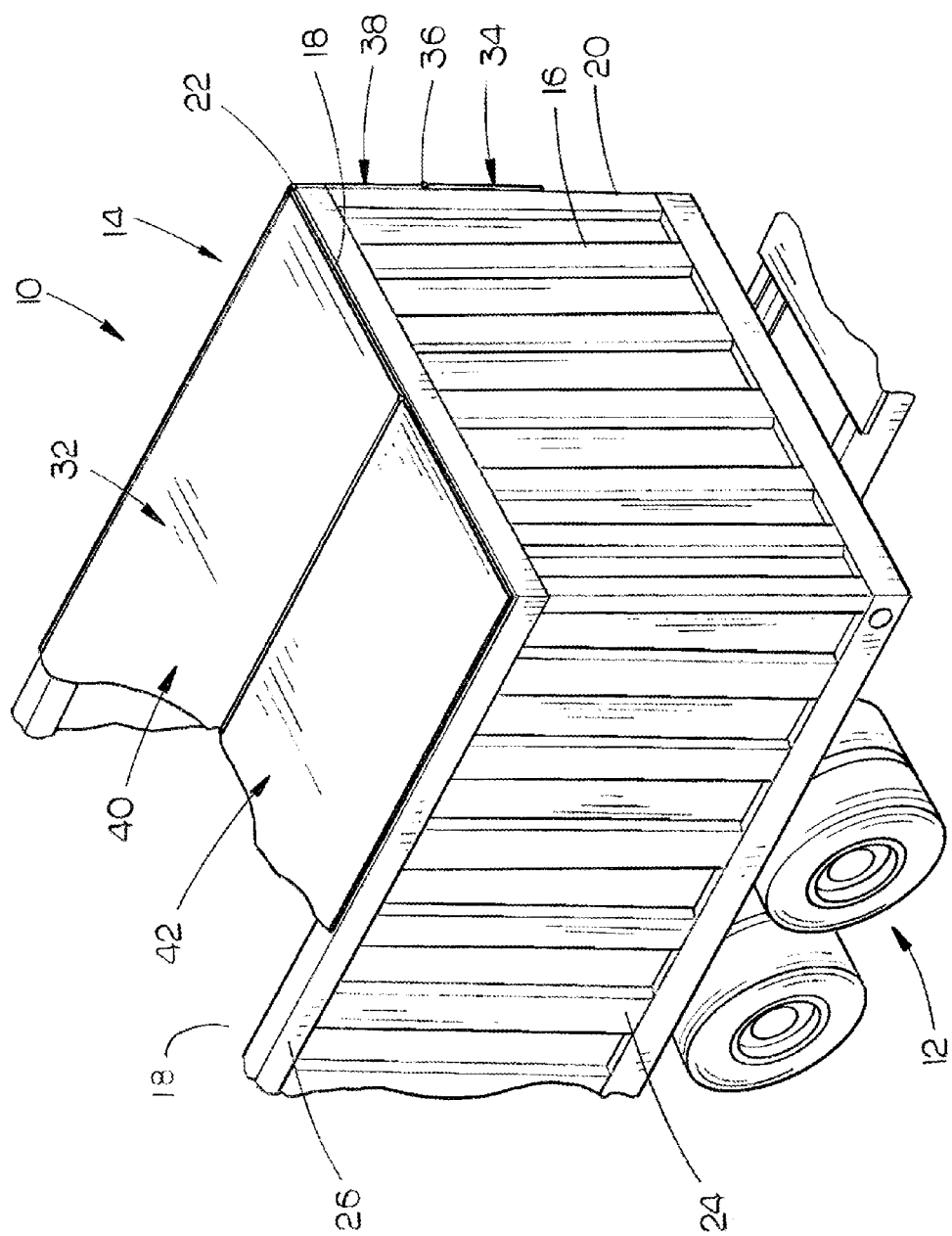
FIG. 3 is a partial front perspective view of the body of FIG. 1.
Figure 4:
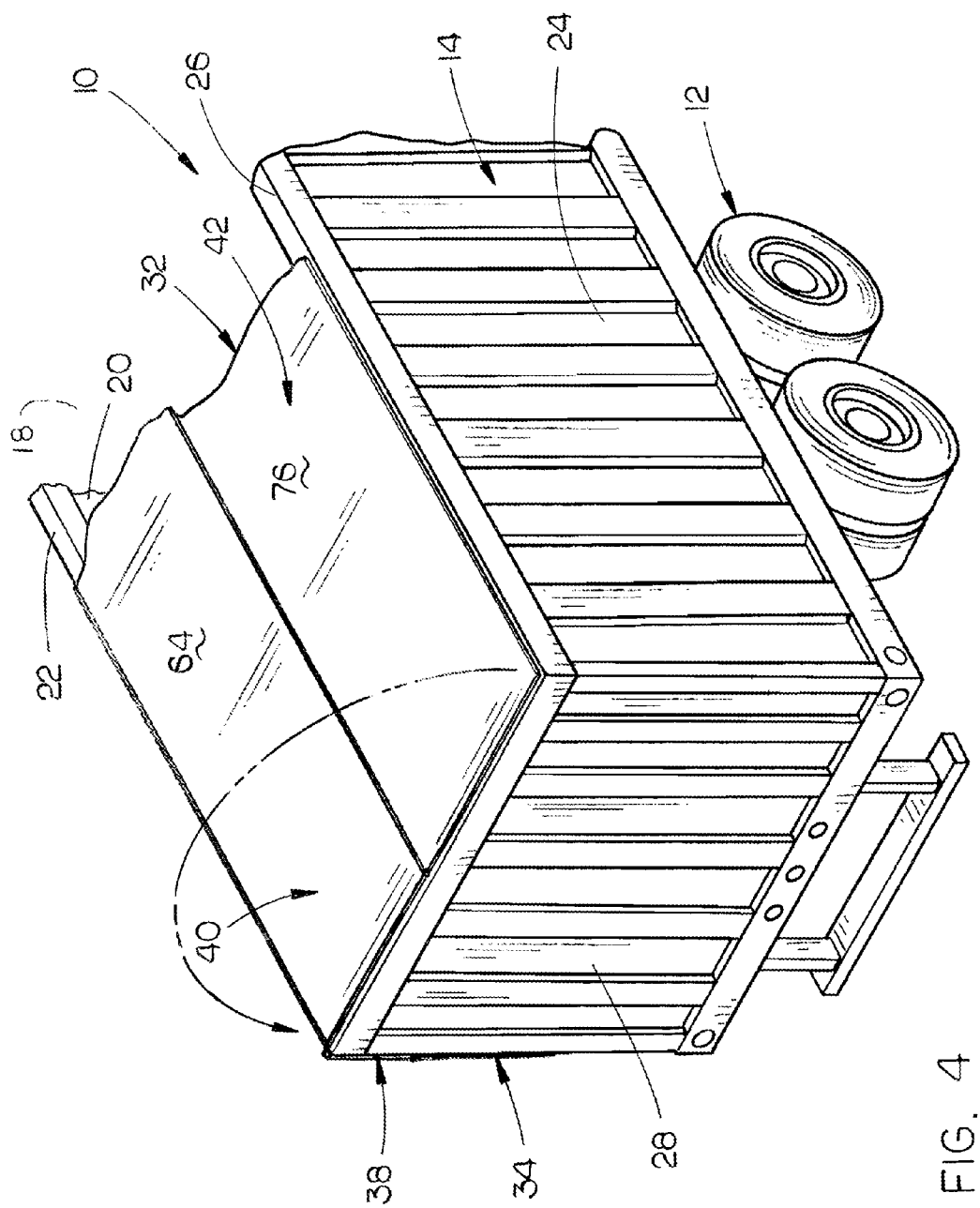
FIG. 4 is a partial rear perspective view of the cover mounted on the trailer of FIG. 1.
Figure 7:
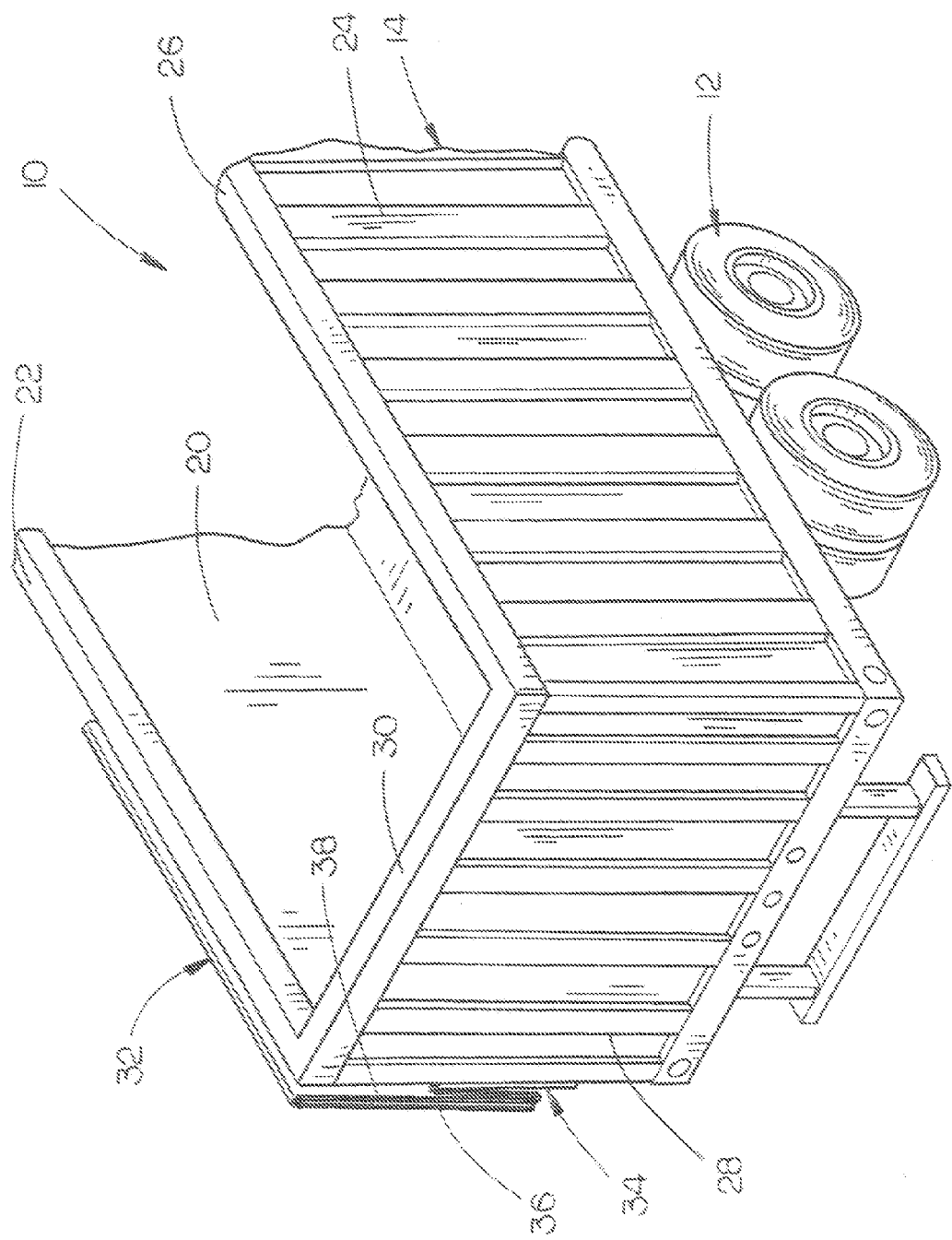
FIG. 7 is a view similar to FIG. 5 except that the cover members have been folded to a stowed position.
Figure 8:
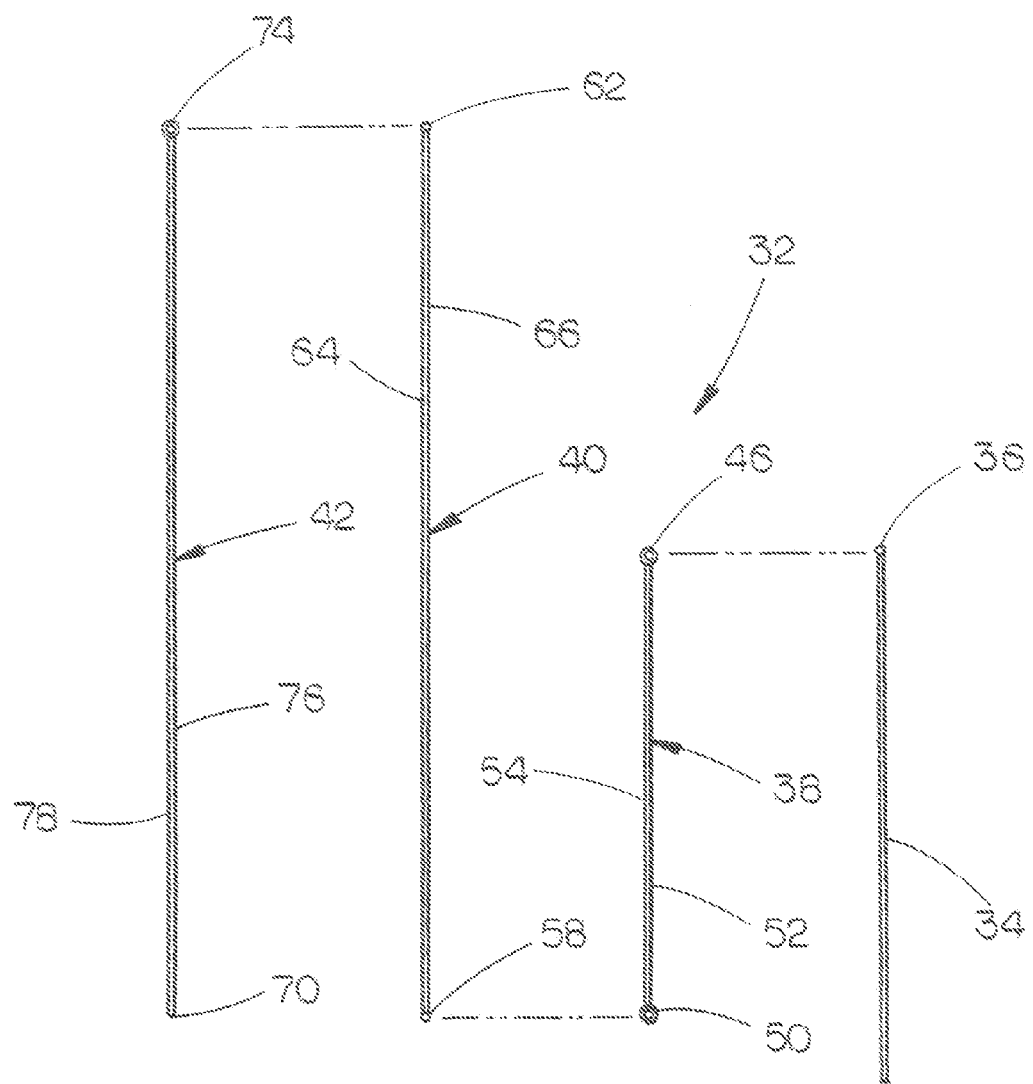
FIG. 8 is an exploded end view of the folding cover of this invention.
Figures 11, 12:
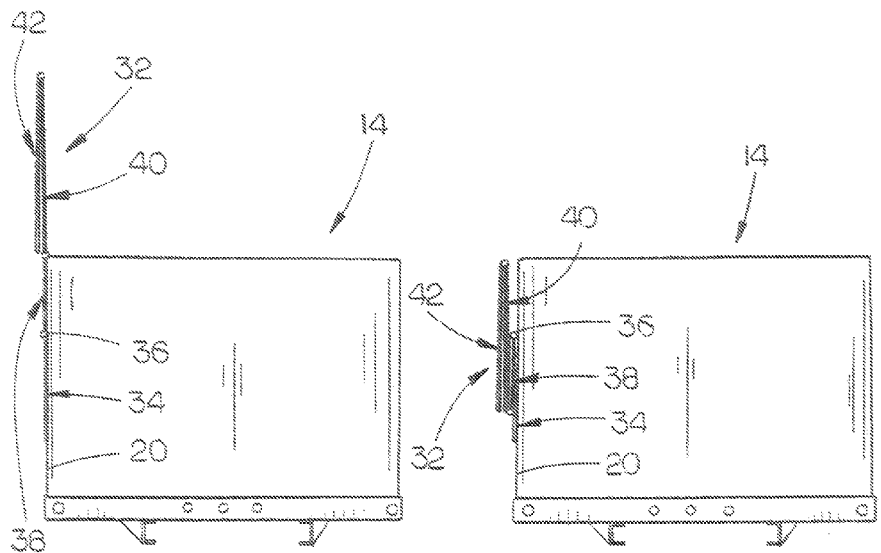
FIG. 11 is a rear view similar to FIG. 10 except that the second and third cover members have been folded upwardly to a vertically disposed position.
FIG. 12 is a rear view similar to FIG. 11 except that the first, second and third cover members have been folded to a stowed position.

The cover 32 may be moved from its stowed position of FIGS. 7 and 12 to its closed position by first moving cover member 38 from the position of FIG. 12 to the position of FIG. 11. The cover members 40 and 42 are then moved from the position of FIG. 11 to the position of FIG. 10 and then move the cover member 42 from the position of FIG. 10 to the position of FIG. 9. FIG. 2 illustrates the cover 32 mounted on the body 14' of a straight truck.

Figure 13:
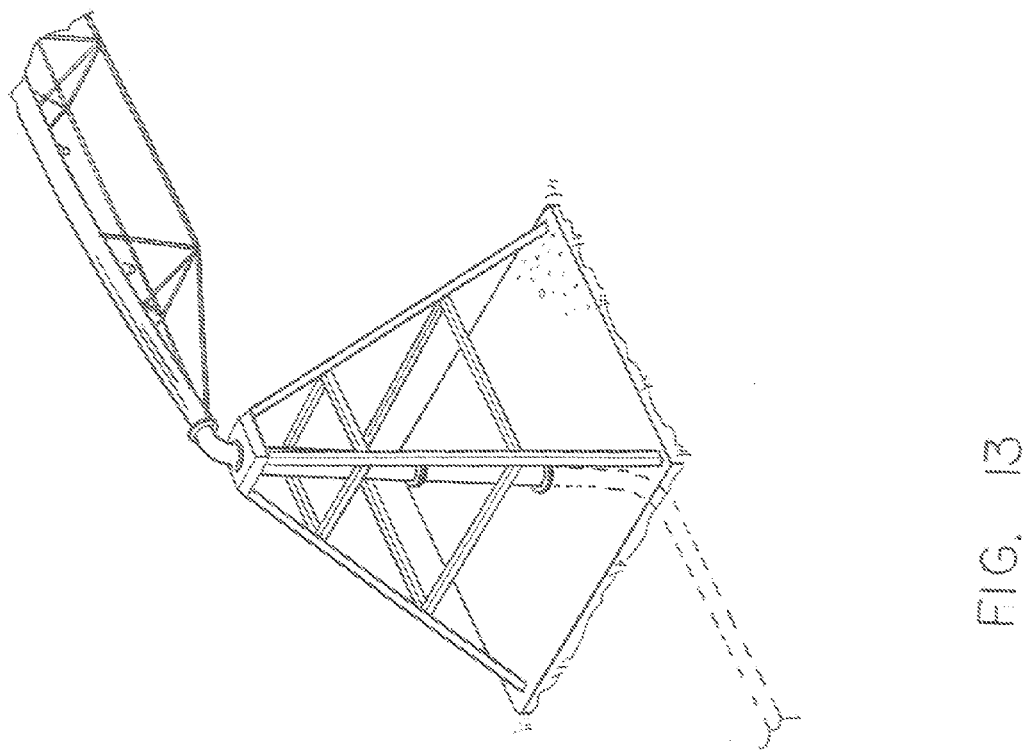
FIG. 13 is a perspective view illustrating the cover of this invention being used to cover an irrigation pump.
Figure 13:
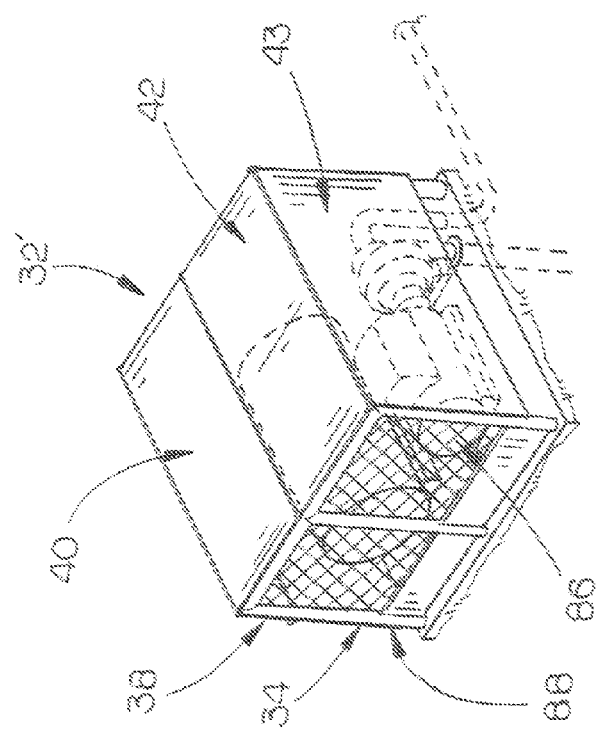

FIG. 13 illustrates a modified cover 32' being used to cover an object such as an irrigation pump 86 or the like. When used to cover an object such as an irrigation pump 86, or other object, a framework 88 will normally be used to support the cover 32'. It may also be desirable to provide an additional cover member 43 to more fully cover the object. FIG. 14 illustrates the modified cover 32 in a fully covering position. The broken lines in FIG. 14 illustrate the manner in which cover members 43 and 42 are initially folded when the cover 32' is to be moved to the stowed position. FIG. 15 illustrates the cover 32' being further folded. FIG. 16 illustrates the cover 32 being further folded. FIG. 17 illustrates the cover 32' in its stowed position.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A folding cover for a body including a front wall having an upper end, a lower end, an inner side and an outer side; a first side wall having an upper end, a lower end, an inner side and an outer side; a second side wall having an upper end, a lower end, an inner side and an outer side; and a back wall having an upper end, a lower end, an inner side and an outer side, comprising:
   a support secured to the outer side of the first side wall below the upper end thereof;
   a first rectangular cover member having a forward end, a rearward end, a first side edge, a second side edge, an outer side and an inner side;
   said first side edge of said first cover member being foldably connected to said support;
   a second rectangular cover member having a forward end, a rearward end, a first side edge, a second side edge, an outer side and an inner side;
   said first side edge of said second cover member being foldably connected to said second side edge of said first cover member;

a third rectangular cover member having a forward end, a rear rd end, a first side edge, a second side edge, an outer side and an inner side;

said first side edge of said third cover member being foldably connected to said second side edge of said second cover member;

said first cover member having a width which substantially equals the distance between the foldable connection of said first side edge of said first cover member and said support;

said second and third cover members having a combined width which is substantially equal to the distance between the upper ends of the first and second side walls of the body;

said first, second and third cover members being selectively movable between a body covering position and a stowed position;

said first cover member being positioned adjacent the outer side of the first side wall of the body when said first, second and third cover members are in said body covering position;

said second and third cover members extending between the upper ends of the first and second side walls of the body when said first, second and third cover members are in said body covering position;

said first, second and third cover members being in a folded position at the outer side of the first side wall of the body when said first, second and third cover members are in said stowed position.

2. The folding cover of claim 1 wherein said first, second and third cover members are positioned at the outer side of the first side wall of the body below the upper end of the first side wall of the body when in said stowed position.

3. The folding cover of claim 2 wherein said first cover member extends downwardly from the foldable connection of said first cover ember and said support which said first, second and third cover members are in said stowed position.

4. The folding cover of claim 1 wherein said first, second and third cover members are comprised of a rigid material.

5. The folding cover of claim 1 wherein said first, second and third cover members are comprised of a semi-rigid material.

6. The folding cover of claim 1 wherein the body is a truck body.

7. The folding cover of claim 1 wherein the body is a trailer body.

8. A folding cover for an irrigation pump having a framework extending therearound with the framework including a first end, a second end, a first side extending between the first and second ends which has an upper end, a lower end, an inner side and an outer side, a second side extending between the first and second ends which has an upper end, a lower end, an inner side and an outer side, comprising:

a support secured to the outer side of the first side of the framework below the upper end thereof;

a first cover member having a forward end, a rearward end, a first side edge, a second side edge, an outer side and an inner side;

said first side edge of said first cover member being foldably connected to said support;

a second cover member having a forward end, a rearward end, a first side edge, a second side edge, an outer side and an inner side;

said first side edge of said second cover member being foldably connected to said second side edge of said first cover member;

a third cover member having a forward end, a rearward end, a first side edge, a second side edge, an outer side and an inner side;

said first side edge of said third cover member being foldably connected to said second side edge of said second cover member;

said first cover member having a width which substantially equals the distance between the foldable connection of said first side edge of said first cover member and said support;

said second and third cover members having a combined width which is substantially equal to the distance between the upper ends of the first and second sides of the framework;

said first, second and third cover members being selectively movable between a pump covering position and a stowed position;

said first cover member being positioned adjacent the outer side of the first side of the framework when said first, second and third cover members are in said pump covering position;

said second and third cover members extending between the upper ends of the first and second sides of the framework when said first, second and third cover members are in said pump covering position;

said first, second and third cover members being in a folded position at the upper end of the first side of the framework when said first, second and third cover members are in said stowed position.

9. The folding cover of claim 8 wherein said first, second and third cover members are positioned at the outer side of the first side of the framework below the upper end of the first side of the framework when in said stowed position.

10. The folding cover of claim 9 wherein said first cover member extends downwardly from the foldable connection of said first cover member and said support when said first, second and third cover members are in said stowed position.

11. The folding cover of claim 8 wherein said first, second and third cover members are comprised of a rigid material.

12. The folding cover of claim 8 wherein said first, second and third cover members are comprised of a semi-rigid material.

13. The folding cover of claim 8 further including a fourth cover member foldably connected to said second side edge of said third cover member, said fourth cover member being positioned at said second side of the framework when said first, second and third cover members are in said pump covering position.

14. A folding cover for an object including a first side with upper and lower ends, a second side with upper and lower ends, comprising:

a support positioned at the first side of the object below the upper end thereof;

a first cover member having a forward end, a rearward end, a first side edge, a second side edge, an outer side and an inner side;

said first side edge of said first cover member being foldably connected to said support;

a second cover member having a forward end, a rearward end, a first side edge, a second side edge, an outer side and an inner side;

said first side edge of said second cover member being foldably connected to said second side edge of said first cover member;

a third cover member having a forward end, a rearward end, a first side edge, a second side edge, an outer side and an inner side;

said first side edge of said third cover member being foldably connected to said second side edge of said second cover member;

said first cover member having a width which substantially equals the distance between the foldable connection of said first side edge of said first cover ember and said support;

said second and third cover members having a combined width which is substantially equal to the distance between the upper ends of the first and second sides of the object;

said first, second and third cover members being selectively movable between an object covering position and a stowed position;

said first cover member being positioned adjacent the first side of the object when said first, second and third cover members are in said object covering position;

said second and third cover members extending between the upper ends of the first and second side walls of the body when said first, second and third cover members are in said object covering position;

said first, second and third cover members being in a folded position at the upper end of the first side of the object when said first, second and third cover members are in said stowed position.

15. The folding cover of claim 14 wherein said first, second and third cover members are positioned at the outer side of the first side of the object below the upper end of the first side of the object when in said stowed position.

16. The folding cover of claim 15 wherein said first cover member extends downwardly from the foldable connection of said first cover ember and said support when said first, second and third cover members are in said stowed position.

17. The folding cover of claim 14 wherein said first, second and third cover members are comprised of a rigid material.

18. The folding cover of claim 14 wherein said first, second and third cover members are comprised of a semi-rigid material.

19. The folding cover of claim 14 further including a fourth cover member foldably connected to said second side edge of said third cover member, said fourth cover member being positioned at said second side of the object when said first, second and third cover members are in said object covering position.

* * * * *